US006978293B1

(12) United States Patent
Wong et al.

(10) Patent No.: US 6,978,293 B1
(45) Date of Patent: Dec. 20, 2005

(54) METHODS AND SYSTEMS FOR SELECTING CRITERIA FOR A SUCCESSFUL ACKNOWLEDGEMENT MESSAGE IN INSTANT MESSAGING

(75) Inventors: Leon Wong, Redmond, WA (US); Sudhanshu Aggarwal, Bellevue, WA (US); Peter Beebee, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 09/713,488

(22) Filed: Nov. 15, 2000

Related U.S. Application Data

(60) Provisional application No. 60/185,827, filed on Feb. 29, 2000.

(51) Int. Cl.[7] .............................................. G06F 15/16
(52) U.S. Cl. ........................ 709/206; 709/207; 709/228
(58) Field of Search ............................... 709/206–207, 709/225, 226, 204, 245, 223–224, 227–228, 709/238, 248

(56) References Cited

U.S. PATENT DOCUMENTS

| | | | |
|---|---|---|---|
| 6,067,567 A * | 5/2000 | Bartfai et al. ............... | 709/221 |
| 6,195,687 B1 * | 2/2001 | Greaves et al. ............. | 709/208 |
| 6,212,548 B1 * | 4/2001 | DeSimone et al. ......... | 709/204 |
| 6,301,609 B1 * | 10/2001 | Aravamudan et al. ...... | 709/207 |
| 6,477,243 B1 * | 11/2002 | Choksi et al. ......... | 379/100.06 |
| 6,484,196 B1 * | 11/2002 | Maurille ...................... | 709/206 |
| 6,499,053 B1 * | 12/2002 | Marquette et al. .......... | 709/204 |
| 6,549,937 B1 * | 4/2003 | Auerbach et al. ........... | 709/206 |
| 6,564,261 B1 * | 5/2003 | Gudjonsson et al. ....... | 709/227 |
| 6,611,822 B1 * | 8/2003 | Beams et al. ................. | 706/11 |
| 6,654,359 B1 * | 11/2003 | La Porta et al. ............ | 370/328 |
| 6,668,169 B2 * | 12/2003 | Burgan et al. ........... | 455/435.1 |
| 6,691,159 B1 * | 2/2004 | Grewal et al. .............. | 709/219 |
| 6,691,162 B1 * | 2/2004 | Wick .......................... | 709/224 |
| 6,807,562 B1 * | 10/2004 | Pennock et al. ............ | 709/204 |

* cited by examiner

Primary Examiner—Ario Etienne
Assistant Examiner—Hussein El-chanti
(74) Attorney, Agent, or Firm—Perkins Coie LLP

(57) ABSTRACT

Methods and systems are described for permitting a user to specify the criteria for determining the success or failure of the transmission of an instant message. A computer system first identifies the user specified criteria. When the server computer system receives an instant message, the computer system determines whether the user specified criteria have been met. If the criteria are met, the computer system returns a successful acknowledgement message to the user. Since the user sets the criteria by which success will be determined, the meaning of a successful acknowledgement message will be clear to the user.

7 Claims, 5 Drawing Sheets

METHODS AND SYSTEMS FOR SELECTING CRITERIA FOR A SUCCESSFUL ACKNOWLEDGEMENT MESSAGE IN INSTANT MESSAGING

CROSS-REFERENCE TO RELATED APPLICATIONS

The present application claims the benefit of United States provisional application Ser. No. 60/185,827, filed 29 Feb. 2000, which provisional application is incorporated herein by reference.

BACKGROUND OF THE INVENTION

1. The Field of the Invention

The present invention relates to the field of electronic communication. In particular, the present invention relates to methods and systems for selecting criteria for a successful acknowledgement message criteria in instant messaging.

2. The Prior State of the Art

Computer networking, and in particular the evolution of the Internet, has transformed the way people communicate and share information. One important technology used in conjunction with computer networks is called "electronic mail" or "e-mail." E-mail allows a sending individual to compose a text message on his/her computer system and then transmit that text message over the computer network to a destination computer system, typically a server computer system, associated with a receiving individual. Once the receiving individual establishes a connection with his/her server computer system, the receiving individual can then retrieve the electronic mail message.

An advantage of electronic mail is that individuals can communicate over very large distances in significantly less time than it would take to physically mail a letter to that location. In addition, modern electronic mail systems allow for the inclusion of "attachments" which may essentially be any file type including text files and even executable files. Thus, entire files can be conveniently transported from one location to another. Once received, the electronic mail text message and any associated attachments are in electronic form and therefore may be easily manipulated by a healthy variety of widely available software packages.

Although electronic mail transmissions typically take less time than physically mailing a letter from one location to another, it can still be a matter of minutes, hours, or even days to transmit an electronic message. In some circumstances, it may be desirable to transmit messages even faster. One technology that enables much faster electronic communication is called "instant messaging."

As the name implies, "instant messaging" permits a sending individual to quickly transmit an electronic message to a receiving individual in a matter of seconds and often within a second. Thus, two individuals can essentially communicate electronically in real time. Instant messaging requires that each individual in the electronic conversation be "logged in." In this description and in the claims, "logged in" means that they either have a dedicated connection to the network such as the Internet used to transmit the instant message, or they are connected to a computer system (typically an instant messaging server) that has a dedicated connection to the network.

When transmitting an instant message, it is often desirable to know whether or not the instant message was successfully delivered. For this reason, acknowledgement messages are often returned back to the instant message sender indicating the success or failure of the instant message transmission.

An acknowledgement message that indicates the successful delivery of an instant message will be referred to in this description and in the claims as a "successful" acknowledgement message. There are several circumstances in which a "successful" acknowledgement message may be returned back to the instant message sender. This ambiguity may leave the sender of the instant message somewhat confused as to the meaning of a "successful" acknowledgement message.

Therefore, what are desired are systems and methods for acknowledging delivery of an instant message in which the meaning of a "successful" acknowledgement message is more clearly defined and understandable to the sender of the instant message.

SUMMARY OF THE INVENTION

In contrast to the prior state of the art, embodiments of the present invention permit a user to specify the criteria for determining the success or failure of the transmission of an instant message. Since the user specifies the criteria, the user is well informed of the meaning of successful acknowledgement message received in response to the transmission of an instant message.

First, the "sending computer system" identifies the user specified criteria. The "sending computer system" may be the client computer system associated with the sender if the client is capable of identifying the user specified criteria and determining whether the criteria are met. Alternatively, the "sending computer system" may be an instant messaging server associated with the sender if the sender's client computer system relies on the instant messaging server to identify the user specified criteria and determine whether the criteria are met. In the latter case, the user specified criteria may be included with the instant message or may have been previously transmitted to the instant messaging server. Thus, the sending computer system identifies the user specified criteria for returning a successful acknowledgement message corresponding to the instant message to the user.

Next, the sending computer system determines whether the user specified criteria for returning a successful acknowledgement message have been met. If they are met, the sending computer system returns a successful acknowledgement message to the user.

The process for determining whether the user specified criteria have been met depend on the user specified criteria. If the user specified criteria is a "single hop", the instant messaging server can determine, based on the very fact that it received the instant message, that the criteria have been met. Alternatively, the sender's client computer system may determine that the criteria have been met by receiving an acknowledgement message from the first server computer system in the chain of computer systems used to transmit the instant message, that the first server computer system received the instant message.

If the user specified criteria is a "deep-or" criteria, meaning that at least one of the members of a distribution list should receive the instant message to be considered successful, the sending computer system (whether it be the instant messaging server associated with the sender, or the client associated with the sender) may determine that the criteria is met as soon it receives acknowledgement from one of the destination server computer systems that at least one of the associated client computer systems received the instant message.

In the context of instant messaging, a distribution list may include, for example, the set of users who have subscribed to the type of notification represented in the instant message. The distribution list may also be the set of client devices that a single user has logged in from. As long as any of the client devices that the user is using receives the instant message, the instant message might be considered successful since any of the client devices are capable of communicating the instant message to the user.

If the user specified criteria is a "deep-and" criteria, meaning that all of the members of the distribution list should receive the instant message in order to be considered successful, the sending computer system will determine success when all destination server computer systems report that all of the members of the distribution list have received the instant message. Thus, the principles of the present invention makes clear the meaning of a successful acknowledgement message in instant messaging by allowing the user to set the criteria for returning a successful acknowledgment message.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention extends both methods and systems for selecting criteria for a successful acknowledgement message in instant messaging. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
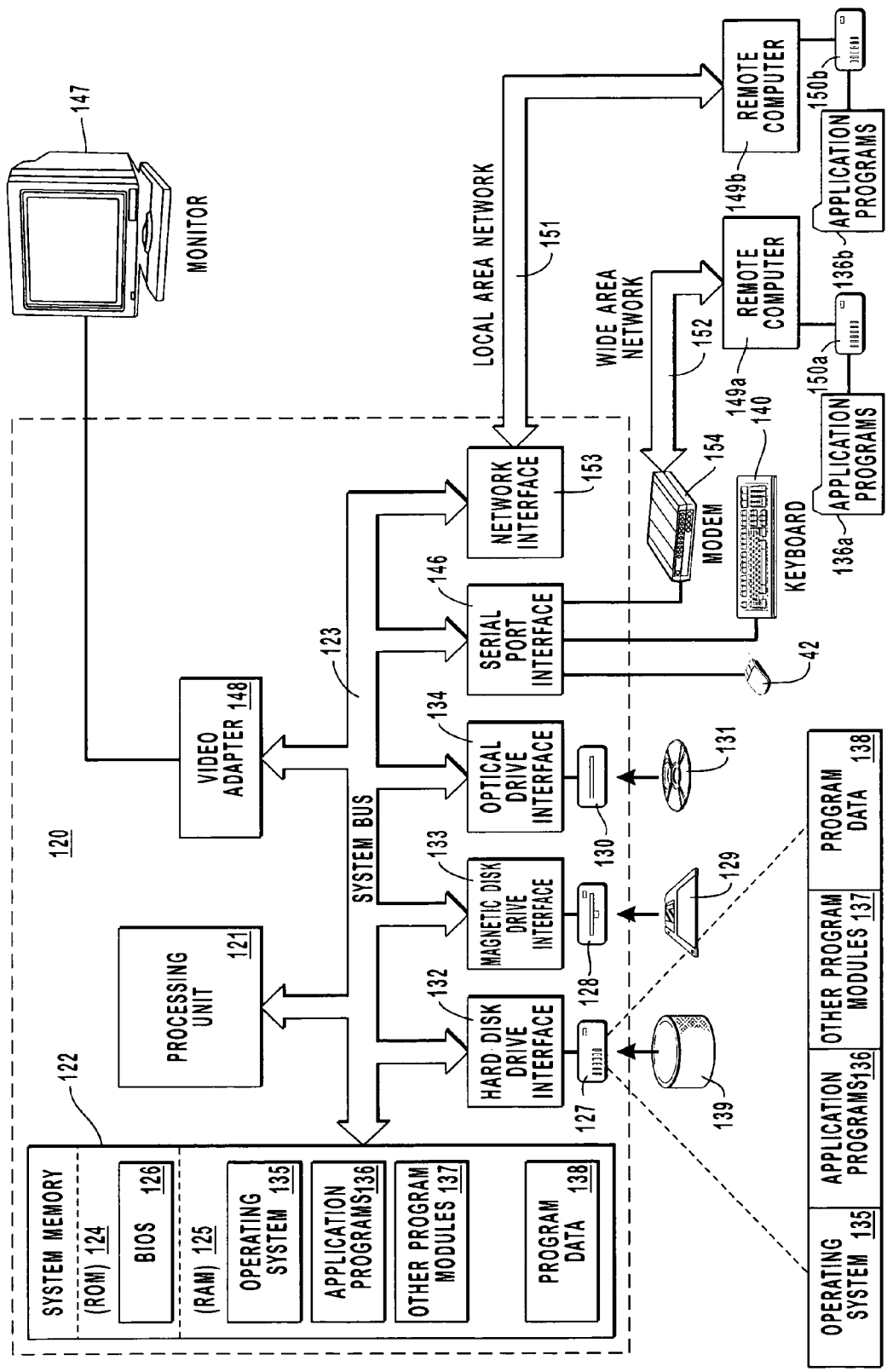
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
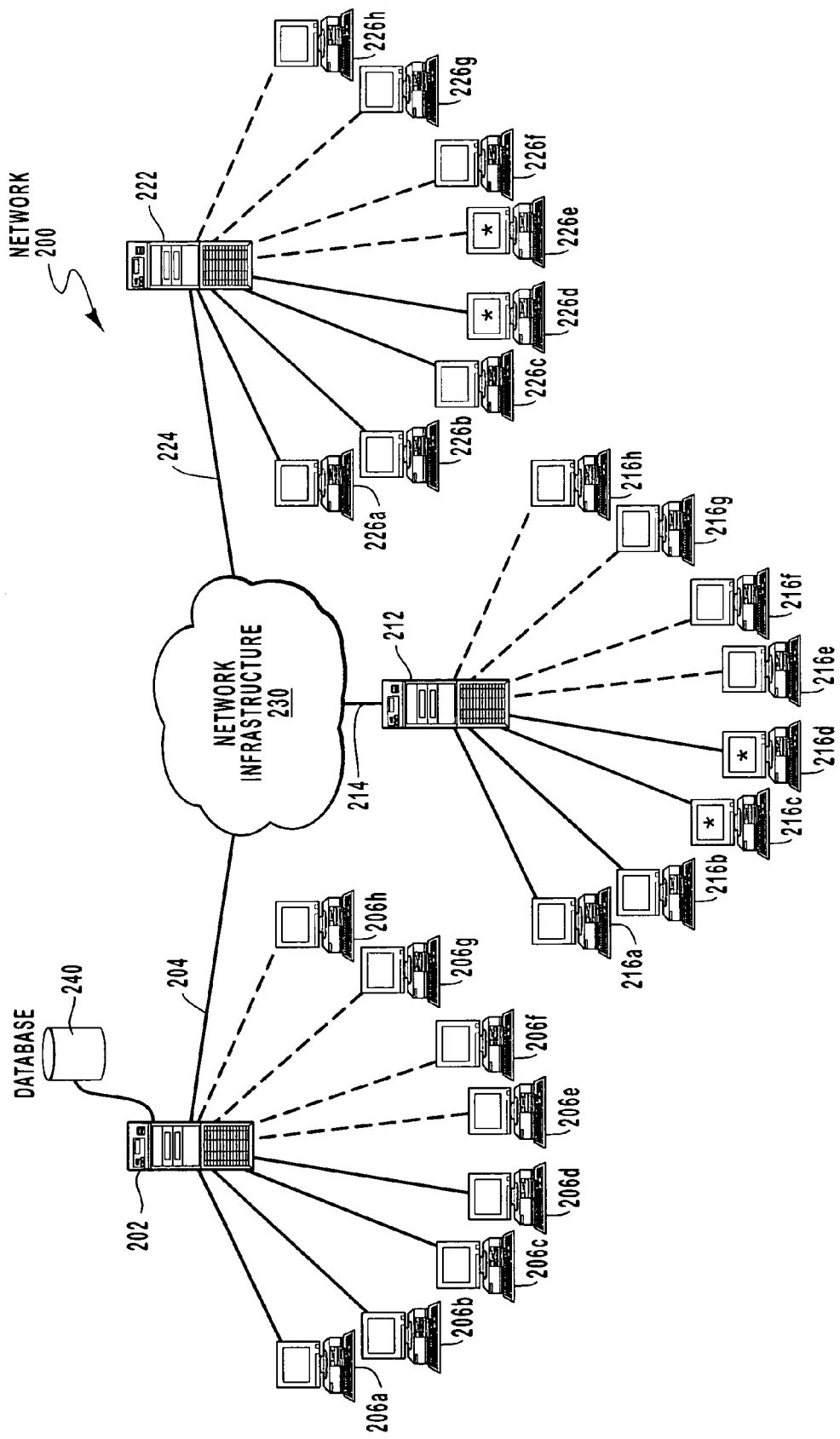
FIG. 2 is illustrates a computer network in which the present invention may operate.

FIG. 2 illustrates a network 200 that may be a suitable operating environment for performing instant messaging. The network 200 includes server computer systems 202, 212 and 222, each having respective dedicated connections 204, 214 and 224 to a network infrastructure 230 that may be used to electronically communicate between the server computer systems.

In this description and in the claims, a "server computer system" is defined as a computer or group of computers that provides services to another computer system. A "computer" is defined as any device capable of processing data such as a personal computer, a personal digital assistant, and the like. Also, a "client computer system" is defined as a computer or group of computers that use the services of another computer system. Note that a computer system may use the services of another computer system and yet still provide services to yet another computer system. Thus, a client computer system in one context may also be a server computer system in another context. Similarly, a server computer system in one context may also be a client computer system in another context. The use of the term "client computer system" to describe a computer system in this description and in the claims does not imply that the computer system may not also act as a server computer system. Similarly, the use of the term "server computer system" does not imply that the computer system may not also act as a client computer system.

The server computer system 202 acts as an instant messaging server for a number of client computer systems 206 including client computers systems 206a, 206b, 206c, 206d, 206e, 206f, 206g and 206h. Client computer systems 206 are capable of establishing a connection with the server computer system 202. Client computer systems 206a, 206b, 206c and 206d are connected to the server computer system 202 as represented by the solid line connecting each of these client computer systems to the server computer system 202. The client computer systems 206e, 206f, 206g and 206h are not currently connected to the server computer system 202 as indicated by the dashed lines connecting these client computer systems to the server computer system 202. However, these computer systems 206e, 206f, 206g and 206h may later be connected to the server computer system 202 as desired.

The server computer system 212 acts as an instant messaging server for a number of client computer systems 216 including client computer systems 216a, 216b, 216c, 216d, 216e, 216f, 216g and 216h. Client computer systems 216a, 216b, 216c and 216d are connected to the server computer system 212 as indicated by the solid connection line. Client computer systems 216e, 216f, 216g and 216h are not currently connected to the server computer system 212 as indicated by the dashed connection lines.

The server computer system 222 acts as an instant messaging server for a number of client computer systems 226 including client computer systems 226a, 226b, 226c, 226d, 226e, 226f, 226g and 226h. Client computer systems 226a, 226b, 226c and 226d are connected to the server computer system 222 as indicated by the solid connection line. Client computer systems 226e, 226f, 226g and 226h are not currently connected to the server computer system 222 as indicated by the dashed connection lines.

Each of the server computer system 202, 212 and 222 and the client computer systems 206a through 206h, 216a through 216h and 226a through 226h may be structured as described above for the computer 120 of FIG. 1 and include some or all of the components described as being included in the computer 120. However, many other computer devices may be used as the server computer systems and client computer systems so long as they are capable of implementing the principles of the present invention as described herein.

Since client computer systems 206a, 206b, 206c, 206d, 216a, 216b, 216c, 216d, 226a, 226b, 226c and 226d are connected to their respective instant messaging server computer systems, these client computer systems may engage in instant messaging. In order to facilitate instant messaging, the server computer systems 202, 212 and 222 keep track of which client computer systems are logged into their respective server computer systems and thus are available for communication by instant messaging. The list of logged in and available client computer systems is shared by the servers 202, 212 and 222 so that each of the server computer systems 202, 212 and 222 is aware of all twelve available client computer systems.

The determination of whether a successful acknowledgement message should be returned to the user may be performed by the sending client computer system 202 itself or may be performed by the first server computer system in the chain of computer systems that are traversed by the instant message in its route to its intended recipients.

If the sending client computer system is the computer system that makes this determination, the sending client computer system first optionally determines whether an intended recipient is available. If available, the instant message is created and addressed with an intended destination address. The sending client computer system then transmits the instant message and returns a successful acknowledgement message if the user specified criteria are met.

Figure 3:
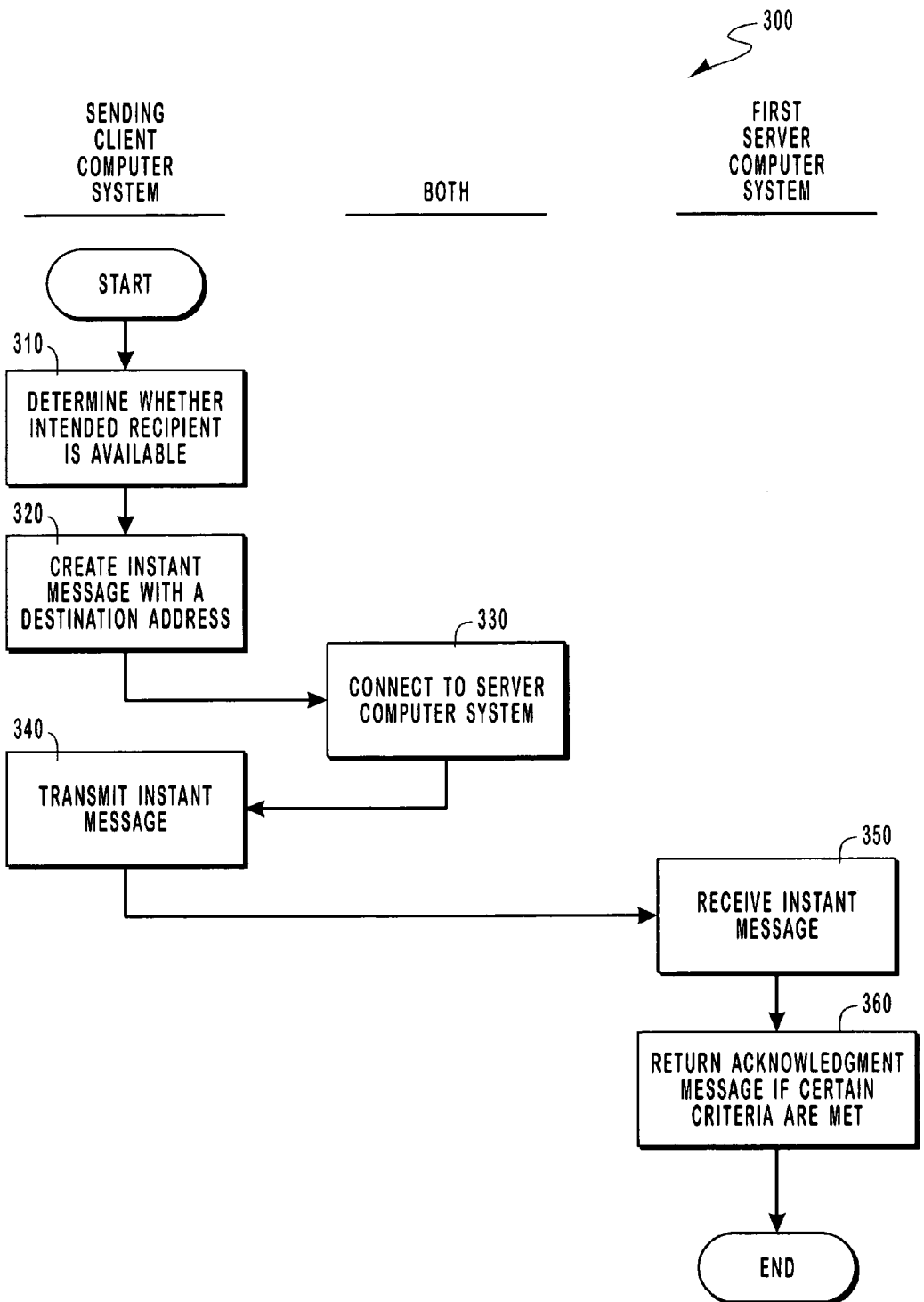
FIG. 3 is a flowchart of a method of sending an instant message using the network of FIG. 2.

FIG. 3 is a flowchart illustrating a method 300 of transmitting an instant message that will be discussed with frequent reference to FIG. 2. Some of the acts involved with transmitting the instant message are performed exclusively by the sending client computer system. These acts are illustrated in the left column of FIG. 3. Other acts are performed exclusively by the first server computer system in contact with the instant message. These acts are illustrated in the right column of FIG. 3. Yet other acts are performed cooperatively by both the client computer system and the server computer system. These acts are illustrated in the center column of FIG. 3.

In order to transmit an instant message, one of the client computer systems optionally first determines with the aid of its instant messaging server computer system whether an intended recipient is available for instant messaging (act 310). For example, suppose that client computer system 206b is to send an instant message to client computer system 216c. Client computer system 206b may confirm that client computer system 216c is available for instant messaging by receiving information from its instant messaging server computer system 202 that the client computer system 216c is logged on. Note that instant messaging may be performed without confirming that the intended recipient is available. However, there would be no guarantee that the recipient would receive the instant message in real time.

Although FIG. 2 shows the server computer system 202 as being a separate computer system from the client computer systems 206, at least some of the functionality of the server computer system 202 may be provided by one or more of the client computer systems 206. These client computer systems would then be "advanced sending clients" having the capability to send an instant message directly to the network infrastructure 230 without using the server computer system 202. Also, the advanced sending clients are also able to determine internally whether the user specified criteria for a successful acknowledgement message have been met. In this description, this embodiment will be referred to as the "advanced sender" embodiment. The embodiment in which the sender's instant messaging server computer system 202 is used will be referred to as the "server assisted" embodiment.

In act 320, the sending computer system creates an instant message identifying an intended destination address. In the example, client computer system 206b may create an instant message and identify an intended destination. In addition, in the server-assisted embodiment, the sending client computer system establishes a connection with the server computer system if needed (act 330) with the assistance of the server computer system. For example, if the client computer system 206b was not already connected to the server computer system 202 the client computer system 206b would perform acts needed to connect to the server computer system 202. If the client computer system 206b has a permanent connection to the server computer system 202, there would, of course, be no need make a connection with the server computer system 202. In the advanced sender embodiment, there would be no need for the sending client computer system 206b to connect with the server computer system since the sending client computer system 206b is capable of sending instant messages directly onto the network infrastructure.

In the server-assisted embodiment, once the instant message is created (act 320), a destination address specified (also act 320), and a connection made with the server computer system (act 330), the sending client computer system may then transmit the instant message (act 340).

The instant message will traverse a number of different server computer systems on the way to its destination. For example, in order for an instant message to be transmitted from the client computer system 206b to the client computer system 216c, the instant message must traverse through the instant messaging server computer system 202 (if in the server assisted embodiment), through a potential myriad of server computer systems on the network infrastructure 230, through the destination instant messaging server computer system 212, and finally to the destination client computer system 216c.

However, in the server-assisted embodiment, the first server computer system to receive the message after the instant message is transmitted is typically a proximate instant messaging server computer system such as the server computer system 202 (act 350). The instant messaging server computer system associated with the sending client computer system returns an acknowledgement message to the sending client computer system if certain criteria are met (act 360). For example, the server computer system 202 may be configured to return an acknowledgement message for all instant messages sent from sending client computer system 206b, for only those instant messages designated as higher priority, or for only those instant messages requested to have a corresponding acknowledgement message. In one example, the sending client computer system 206b specifically designates as part of the creation of the instant message that an acknowledgement message is desired for the instant message. In this case, the server computer system 202 will return an acknowledgement message (step 360), regardless of the content of that acknowledgement message. In the advanced sender embodiment, the client computer system 206b performs the functionality of the server computer system 202 in determining whether the user specified criteria are met and returning an appropriate acknowledgement message to the user of the client computer system 206b.

As part of the step of returning an acknowledgement message, a determination is made of whether or not certain user-specified criteria have been met for sending a "successful" acknowledgement message. Accordingly, embodiments within the scope of the present invention include a step or means for determining whether or not certain user-3 specified criteria have been met for returning a "successful" acknowledgement message.

First, the user-specified criteria are identified. These criteria are set by a user and may have been entered by the user of the sending client computer system. In the server-6 assisted embodiment, these user specified criteria may have been previously transmitted to the server computer system for storage in a database 240 (FIG. 2) accessible by the server computer system. Alternatively, the user-specified criteria may accompany the instant message itself. In the advanced sender embodiment, the user-specified criteria may be stored in a similar database accessible by the sending client computer system. Once the user-specified criteria have been identified, a determination is made as to whether or not the applicable user-specified criteria have been met.

As an example, one set of criteria for determining whether a successful acknowledgement message should be sent is referred to as a "single hop" criteria set. Using this criteria set, if the instant message is received by the first computer system in the chain of computer systems needed to transmit the instant message, a successful acknowledgement message is returned.

In the server-assisted embodiment, in transmitting from the client computer system 206b to the client computer system 216c, the first computer system would be the instant messaging server computer system 202. Thus, the server computer system 202 could determine, by the very fact that the server computer system 202 received the instant message, that the criteria for a successful acknowledgement message have been met.

In the advanced sender embodiment, the first server computer system in the network infrastructure 230 would indicate to the client that the server computer system received the instant message. The client computer system 206b would then determine that the single hop criteria have been met and acknowledge this to the user.

Another set of criteria for determining whether a successful acknowledgement message should be sent is referred to as a "deep-or" criteria set which will now be described. In instant messaging, any destination address could potentially be a distribution list if other entities can subscribe to instant messages received by the destination address.

For example, the destination address may be "team_members". A number of entities may have subscribed to messages received by the destination address "team_members". For example, suppose that entities having address "first_member", "second_member" and "subteam_members" have subscribed to the address "team_members" by indicating that any message destined for the address "team_members" should also be forwarded to the addresses "first_member", "second_member" and "subteam_members". The address "team_members" functions as a destination list having three members "first_member", "second_member" and "subteam_members".

Any member of a distribution list may also be a distribution list. For example, suppose that entities having addresses "first_submember" and "second_submember"subscribed to the address "subteam_members". Any messages destined for the address "subteam_members" would also be forwarded to addresses "first_submember" and "second_submember". Thus, any address could potentially be a distribution list and multiple distribution lists may be layered.

If the destination address is not a distribution list (i.e., no entities have subscribed to the destination address), then "successful" delivery under the "deep-or" criteria set means that the destination address simply received the instant message. On the other hand, if the destination address is a distribution list (i.e., one or more entities have subscribed to the destination address), then "successful" delivery under the "deep-or" criteria set means that the instant message has been successful delivered under the "deep-or" criteria to any of the entities that subscribed to that destination address.

For example, suppose that the entity represented by "first_member" receives the instant message through its subscription to "team_members". In this case, the destination address "team_members" is a distribution list since other entities have subscribed to the destination address. Since "first_member" is not a distribution list, and since "first_member" received the instant message, delivery of the instant message to "first_member" was successful under the deep or criteria. For this reason, delivery to "team_members" was also successful under the deep or criteria. The same result would apply for similar reasons if "second_member" receives the instant message.

Suppose now that one of "first_submember" or "second_submember" successful receives the instant message. Since neither entity is a distribution list, delivery to the entity is successful under the deep-or criteria since the submember received the instant message. However, "subteam_members" is a distribution list. Therefore, delivery is considered successful to "subteam_members" only if one of its subscribing members was successfully delivered the instant message under the "deep-or" criteria. Since delivery to one of "first_submember" or "second_submember" was successful under the "deep-or" criteria set, delivery to "subteam_members" is also deemed successful under the "deep-or" criteria. Furthermore, since "subteam_members" subscribes to "team_members", delivery to "team_members" is deemed successful under the "deep-or" criteria.

Figure 4:
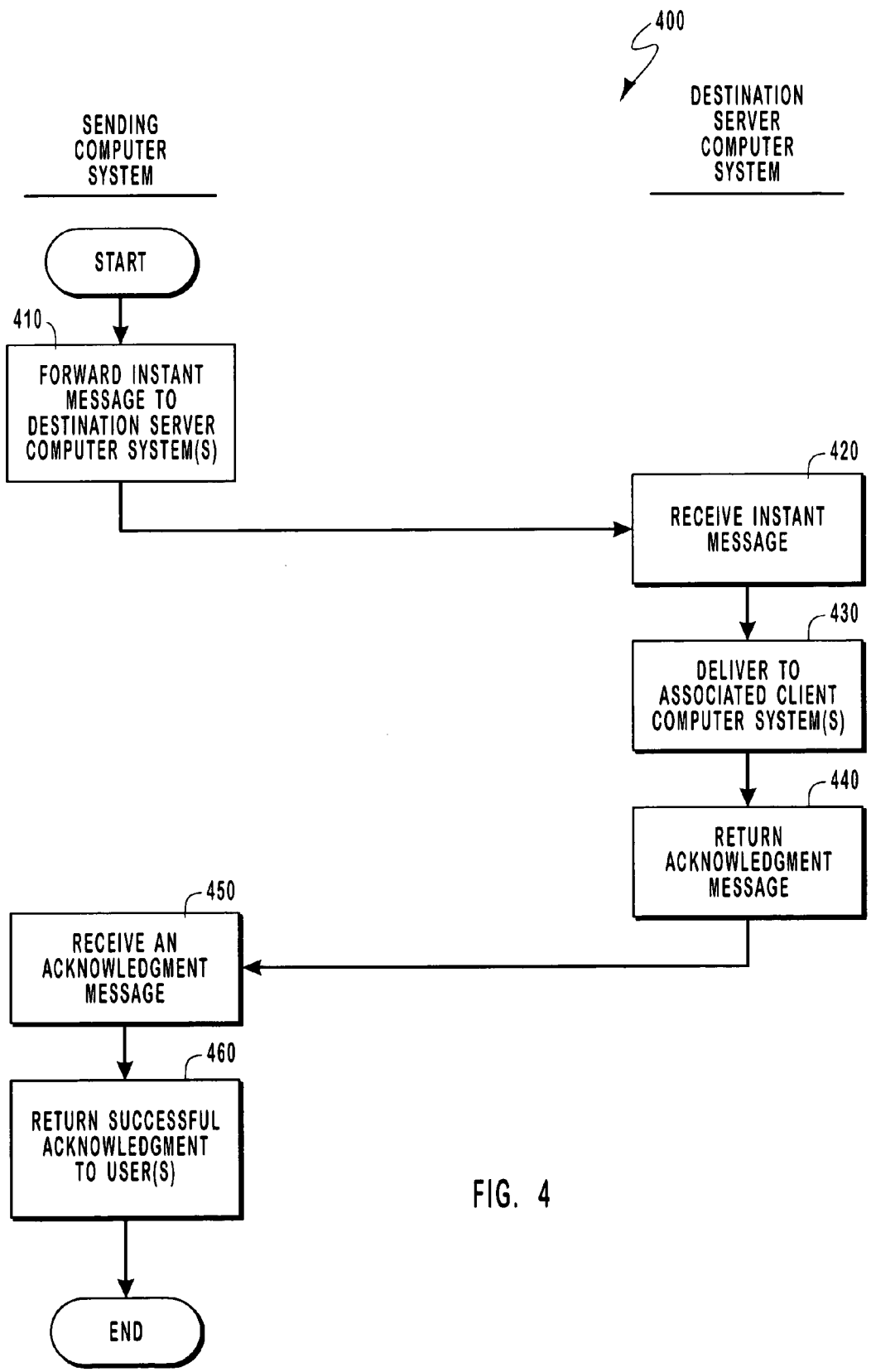
FIG. 4 is a flowchart of a method of determining whether "deep-or" acknowledgement criteria have been met.

FIG. 4 illustrates a method 400 for determining whether a "successful" acknowledgement message should be returned to the user using the "deep-or" criteria set. The acts of the method 400 are either performed by the sending computer system (i.e., the sender's instant messaging server in the server assisted embodiment, or the sending client computer system in the advanced sender embodiment) or by the destination server computer system(s). The left column of FIG. 4 illustrates those acts that are performed by the sending computer system while the right column illustrates those acts that are performed by each destination server computer system having associated client computer systems that have subscribed to the destination address. The method 400 will be described using an example in which the client computer system 206b attempts to sends an instant message to the destination address "team_members" which has been subscribed to by client computer systems 216c, 216d, 226d and 226e.

Immediately after receiving the instant message for distribution to the destination address "team_members", the sending computer system typically cannot yet determine whether a "successful" acknowledgement message should be sent under the "deep-or" criteria set since the sending computer system does not know whether at least one of the subscribing client computer system 216c, 216d, 226d and 226e will receive the instant message. One exception might be if the sending computer system has notice that all of the subscribing client computer systems are off-line or are otherwise unavailable for instant messaging. In this exception, the sending computer system may be configured to immediately return a "failed" acknowledgement message indicating that the instant message was not successfully delivered to any of the members of the distribution list. Typically, however, the sending computer system may not know whether or not a "successful" acknowledgement message should be sent without actually attempting to send the instant message to at least some of the subscribing client computer systems.

Thus, after receiving the instant message, the sending computer system will typically forward the instant message to at least some of the subscribing client computer systems (act 410). This will involve determining what destination server computer systems exist that serve those subscribing members. In the example of the distribution list "team_members", both destination server computer systems 212 and 222 serve the subscribing client computer systems 216c, 216d, 226d and 226e. Thus, the instant message is forwarded to both destination server systems 212 and 222 over the network infrastructure 230.

Each destination server computer system 212 and 222 then ideally receives the instant message (act 420). Once received, the instant message is then delivered to all the subscribing members of the distribution list "team_members" that are capable of receiving the instant message (act 430). In the example, the destination server computer system 212 delivers the instant message to client computer system 216c and 216d since both are logged onto the server computer system 212 and are available for instant messaging. The destination server computer system 222 delivers the instant message to the client computer system 226d which is logged in and available for instant messaging. However, destination server computer system 222 does not deliver the instant message to client computer system 226e since that client computer system is not available for instant messaging.

The destination computer systems then each return an acknowledgement message to the sending computer system (act 440). This acknowledgement message indicates at least whether delivery of the instant message to one of its associated client computer systems was successful under the "deep-or" criteria set. Assuming that the addresses corresponding to client computer systems 216c, 216d, 226d and 226e are not distribution lists, delivery to any of the client computer systems would be deemed successful under the "deep-or" criteria set by the mere delivery to the associated client computer system. However, if a given one of the addresses were subscribed to by yet other addresses, then delivery to the other subscribing address would need to be attempted before successful delivery to the given one of the addresses could be deemed successful.

Once the sending computer system receives such an acknowledgement message from one of the destination server computer system (act 450), then the sending computer system can determine that at least one of the members of the distribution list was successfully delivered the instant message under the "deep-or" criteria set (act 460). In the example, the sending computer system can send a "successful" acknowledgement message to the user as soon as it receives the acknowledgement message from either the server computer system 212 or the server computer system 222.

Another set of criteria for determining whether a successful acknowledgement message should be sent is referred to as a "deep-and" criteria set. The "deep-and" criteria set is much more strict that the "deep-or" criteria set in that the "deep-and" criteria set requires that all of the members in a distribution list receive the instant message before delivery to the distribution list is deemed successful. For example, take the above example, in which "first_member", "second_member" and "subteam_members" subscribed to "team_members" and in which "first_submember" and "second_submember" subscribed to "subteam_members." If "second_submember" was not successfully delivered the instant message, then delivery of the instant message to "subteam_members" is not deemed successful since one of its members "second_submember" did not receive the instant message. Likewise, delivery to "team_members" is not deemed successful since delivery to one of its members "subteam_members" was not deemed successful.

Figure 5:
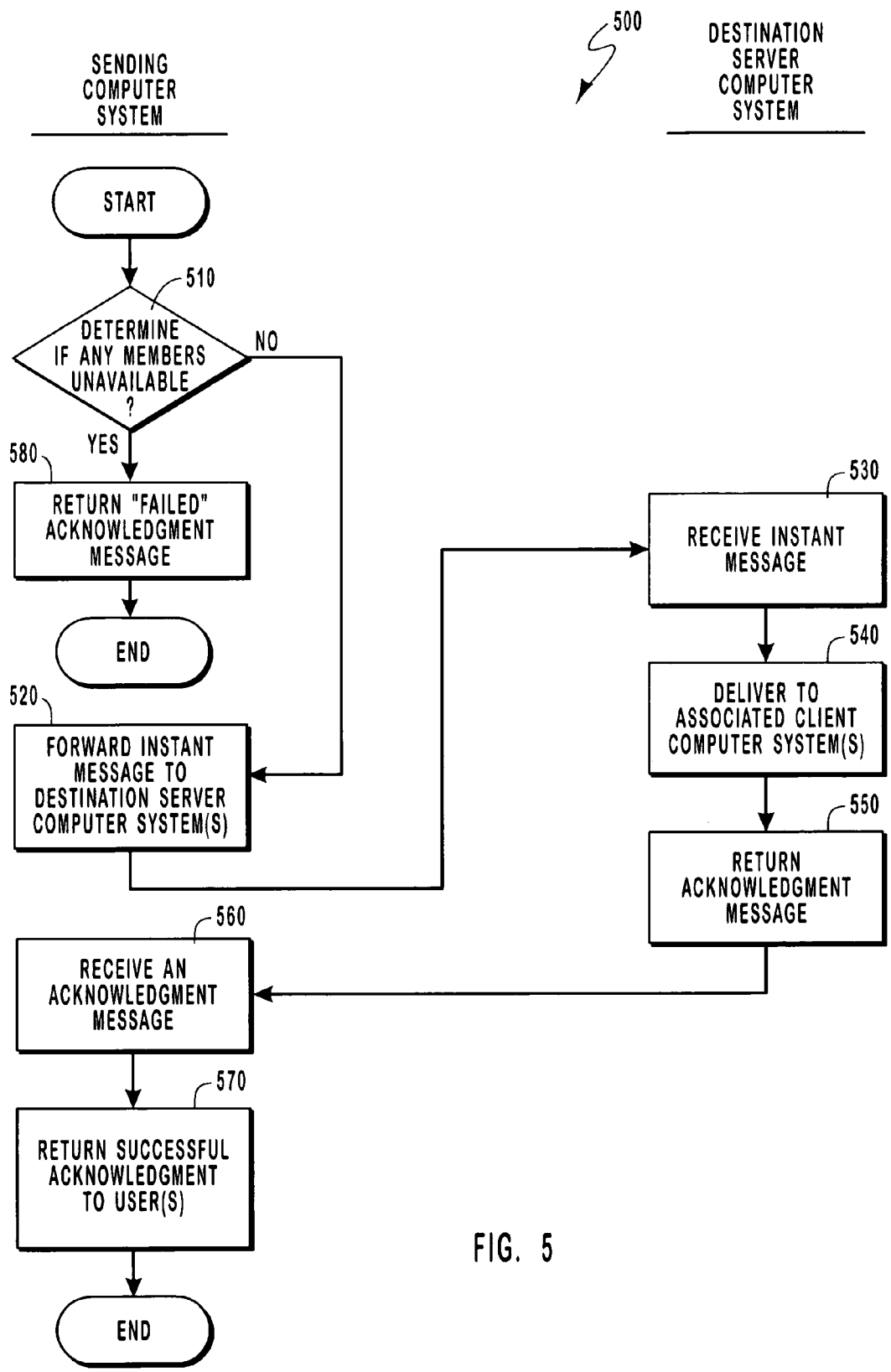
FIG. 5 is a flowchart of a method of determining whether "deep-and" acknowledgement criteria have been met.

FIG. 5 illustrates a method 500 for determining whether a "successful" acknowledgement message should be returned to the user using the "deep-and" criteria set. The acts of the method 500 are either performed by the sending computer system (i.e., the sender's instant messaging server in the server assisted embodiment, or the sending client computer system in the advanced sender embodiment) or by the destination server computer system. The left column of FIG. 5 illustrates those acts that are performed by the sending computer system while the right column illustrates those acts that are performed by each destination server computer system. The method 500 will also be described using the example in which the client computer system 206b attempts to sends an instant message to the distribution list "team_members" which include client computer systems 216c, 216d, 226d and 226e.

Immediately after receiving the instant message for distribution to member of the distribution list "team_members", the sending computer system may be able to determine if any of the members of the distribution list are unavailable for instant messaging (decision block 510). If any are unavailable, the sending computer system may be able to determine that the "deep-and" criteria will not be satisfied even before attempting to send the instant message to members of the distribution list. In this case (yes in decision block 510), the sending computer system 202 may immediately return a "failed" acknowledgement message (act 580) to the user even before any acknowledgement messages are received back from the destination computer system.

If the sending computer system cannot confirm that any of the members of the distribution list are unavailable for instant messaging (no in decision block 510), then the sending computer system would need to confirm delivery by attempting to deliver the instant message to each member of the distribution list (act 520). The sending computer system may, of course, also attempt to deliver the instant message to as many on the distribution list as possible even though the sending computer system may have determined that some on the distribution list may not be available for delivery of the instant message.

The forwarding of the instant message may involve identifying each destination server computer system that is associated with a client computer system in the distribution list. In the example, the instant message is forwarded to both destination server systems 212 and 222 over the network infrastructure 230.

Each destination server computer system 212 and 222 then receives the instant message (act 530). Once received, the instant message is then delivered to all the associated client computer systems in the distribution list that are capable of receiving the instant message (act 540). In the example, the destination server computer system 212 delivers the instant message to client computer system 216c and 216d since both are logged onto the server computer system 212 and are available for instant messaging. The destination server computer system 222 delivers the instant message to the client computer system 226d which is logged in and available for instant messaging. However, the instant message is not received by client computer system 226e since that client computer system is not available for instant messaging.

The destination computer systems then each return an acknowledgement message to the sending computer system (act 550). This acknowledgement message indicates at least whether delivery of the instant message was successful to all of its associated client computer systems that are included in the distribution list.

Once the sending computer system receives such an acknowledgement message from all of the destination server computer systems that have associated client computer system in the distribution list (act 560), then the sending computer system can determine that at least all of the client computer systems in the distribution list successfully received the instant message under the "deep-and" criteria set. (act 570). In the example, the sending computer system cannot send a "successful" acknowledgement message to the user since the sending computer system would not have received a successful acknowledgement message from one of the destination server computer systems 222. This is because the destination computer system 222 could not deliver the instant message to the client computer system 226e since that client computer system was unavailable for instant messaging.

While the "single hop", "deep-or" and "deep-and" criteria sets have been specifically described, there may be any other criteria set that may be defined for a "successful" acknowledgement message. For example, the user may define a time frame that delivery of the instant message must be completed by in order to be considered a successful delivery. Also, the user may specify which members of the distribution list must receive the instant message in order to be considered a successful delivery. Also, a user may specify that delivery to the destination server may be sufficient to constitute "successful" delivery even if that instant message is not immediately forwarded to the client computer system.

The user may specify the criteria set that must be satisfied. Alternatively, the sending computer system or some other server computer system may determine automatically what criteria set must be satisfied in order to be considered a successful delivery of the instant message. For example, if the destination address is a distribution list and the instant message has a normal priority, a "deep-or" criteria set may be used in reporting on a successful delivery. On the other hand, if the instant message has a high priority, a "deep-and" criteria set may be used in reporting a successful delivery.

The above describes a system and method for determining and selecting criteria sets for use in acknowledgement messages in instant messaging. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network that includes a plurality of networked computer systems, wherein a sending computer system sends an instant message through a chain of one or more computer systems to a destination computer system, a method of acknowledging delivery of the instant message, wherein the criteria for determining the success or failure of the delivery are user specified, the method comprising:

an act of the sending computer system identifying the user specified criteria for returning a successful acknowledgment message corresponding to the instant message to the user;

an act of the sending computer system sending the instant message to the destination computer system and receiving a successful acknowledgment message;

an act of the sending computer system, upon receiving a successful acknowledgement message, determining whether the user specified criteria for returning a successful acknowledgment message are met; and an act of the sending computer system returning a successful acknowledgment message corresponding to the instant message only if the user specified criteria have been met, wherein the user specified criteria is a "single hop" criteria, and the act of the sending computer system determining whether the user specified criteria for returning a successful acknowledgment message are met comprises an act of determining that the user specified criteria have been met if the first server computer system in the chain of computer systems receives the instant message.

2. A method in accordance with claim 1, wherein the sending computer system comprises a server computer system associated with the user.

3. A method in accordance with claim 1, wherein the sending computer system comprises a server computer system associated with a sending client computer system.

4. A method in accordance with claim 3, wherein the act of the computer system identifying the user specified criteria for returning a successful acknowledgment message comprises the following:

an act of the sending server computer system receiving a data field representing the user specified criteria with the instant message; and an act of the sending server computer system reading the data field to identify the user specified criteria.

5. A method in accordance with claim 1, wherein the act of the computer system identifying the user specified criteria for returning a successful acknowledgment message comprises the following:

an act of reading a data field representing the user specified criteria from a database accessible to the sending computer system.

6. In a computer network that includes a plurality of networked computer systems, wherein a sending computer system sends an instant message through a chain of one or more computer systems to a destination computer system, a method of acknowledging delivery of the instant message, wherein the criteria for determining the success or failure of the delivery are user specified, the method comprising:

an act of the sending computer system sending the instant message to the destination computer system;

an act of the sending computer system receiving a successful acknowledgment message for the sent instant message;

a step for the sending computer system determining whether user specified criteria for returning a successful acknowledgment message corresponding to the received successful acknowledgment message for the instant message are met; and an act of the sending computer system returning a successful acknowledgment message corresponding to the received successful acknowledgment message for the instant message only if the user specified criteria have been met, wherein the user specified criteria is a singe hop criteria and the step for the sending computer system determining whether user specified criteria for returning a successful acknowledgment message corresponding to the received successful acknowledgment message for the instant message are met comprises an act of determining that the user specified criteria are satisfied if the first server computer system in the chain of computer systems receives the instant message.

7. A storage media containing instructions for controlling a sending computer system to determine whether delivery of an instant message was successful, comprising:

sending via a computer network the instant message to a destination computer system;

receiving via the computer network a successful acknowledgement message for the instant message;

determining whether the successful acknowledgement message satisfies a user-specified criterion for success of delivery of the instant message; and when the user-specified criterion is satisfied, indicating that delivery of the instant message was successful, wherein the instant message is sent via a chain of one or more computer systems to the destination computer system and the user-specified criterion specifies a single hop wherein the delivery is successful when the first computer system in the chain receives the instant message.

* * * * *

UNITED STATES PATENT AND TRADEMARK OFFICE
CERTIFICATE OF CORRECTION

PATENT NO. : 6,978,293 B1  Page 1 of 1
APPLICATION NO. : 09/713488
DATED : December 20, 2005
INVENTOR(S) : Leon Wong et al.

It is certified that error appears in the above-identified patent and that said Letters Patent is hereby corrected as shown below:

In column 9, line(s) 9-10, delete "user-3 specified" and insert -- user-specified --, therefor.

In column 9, line(s) 14-15, delete "server-6 assisted" and insert -- server-assisted --, therefor.

In column 10, line 1, delete ""second_submember"subscribed" and insert -- "second_submember" subscribed --, therefor.

In column 13, line 32, after "set" delete ".".

In column 15, line(s) 15-16, in Claim 6, delete "singe hop" and insert -- single hop --, therefor.

Signed and Sealed this

Twenty-first Day of July, 2009

JOHN DOLL
*Acting Director of the United States Patent and Trademark Office*